United States Patent
Yang et al.

(10) Patent No.: US 12,501,190 B2
(45) Date of Patent: Dec. 16, 2025

(54) MULTI-WAFER STACKED CMOS IMAGE SENSOR STRUCTURE

(71) Applicant: TAIWAN SEMICONDUCTOR MANUFACTURING COMPANY LTD., Hsinchu (TW)

(72) Inventors: Ming-Hsien Yang, Taichung (TW); Chia-Yu Wei, Tainan (TW); Chun-Hao Chou, Tainan (TW); Kuo-Cheng Lee, Tainan (TW); Chung-Liang Cheng, Changhua County (TW); Sheng-Chau Chen, Tainan (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 225 days.

(21) Appl. No.: 18/344,807

(22) Filed: Jun. 29, 2023

(65) Prior Publication Data
US 2025/0008244 A1 Jan. 2, 2025

(51) Int. Cl.
H04N 25/79 (2023.01)

(52) U.S. Cl.
CPC ................ *H04N 25/79* (2023.01)

(58) Field of Classification Search
CPC .............. H04N 25/79; H04N 25/771
See application file for complete search history.

(56) References Cited

U.S. PATENT DOCUMENTS

| | | | |
|---|---|---|---|
| 9,888,197 B1* | 2/2018 | Hynecek | H10F 39/199 |
| 2017/0099423 A1* | 4/2017 | Cremers | H04N 23/741 |
| 2022/0321816 A1* | 10/2022 | Ochiai | H04N 25/59 |
| 2023/0035346 A1* | 2/2023 | Shimada | G01S 17/36 |

* cited by examiner

*Primary Examiner* — Albert H Cutler
(74) *Attorney, Agent, or Firm* — WPAT LAW; Anthony King

(57) ABSTRACT

A stacked CMOS image sensor (CIS) structure is provided. The stacked CIS structure comprises a first die, a second die and a third die. The first die comprises a photodiode, a transfer gate, a selective conversion gain (SCG) switch, a reset switch, a floating node diffusion capacitor and a SCG diffusion capacitor. The second die comprises a source follower transistor and a row select switch. The third die comprises an image sensing circuit electrically connected to the third floating node.

20 Claims, 11 Drawing Sheets

MULTI-WAFER STACKED CMOS IMAGE SENSOR STRUCTURE

BACKGROUND

The present disclosure relates to CMOS image sensor (CIS) structure, and more particularly, to multi-wafer stacked CIS structure.

In recent years, CMOS (Complementary Metal-Oxide-Semiconductor) image sensors have been widely used in various applications, including smartphones, digital cameras, security systems, and medical imaging devices. With their high resolution, low power consumption, and fast processing speed, CMOS image sensors have revolutionized the way we capture and process images. They have also enabled new applications such as augmented reality, facial recognition, and autonomous vehicles. There are continued development and innovation in CMOS image sensor technology which impacts various industries.

Multi-wafer technology is crucial for the production of high-quality CMOS image sensors. By using multiple wafers in the manufacturing process, we can increase production efficiency and yield, while maintaining strict quality control. This technology allows for the integration of complex circuitry and advanced features, such as high dynamic range and low-light sensitivity, into small form factors. There is a grown importance of multi-wafer technology in the development of cutting-edge CMOS image sensors, and its potential to drive innovation in various industries.

One major challenge of multi-wafer stacked CIS structure is the issue of thermal noise. As the stacked CMOS image sensor has multiple layers, the heat generated during operation can cause thermal noise, which reduces the image quality. To mitigate this issue, manufacturers are exploring various techniques such as reducing the size of the pixels, incorporating cooling mechanisms, and using advanced materials with better thermal conductivity.

Another challenge is related to the manufacturing process. The fabrication process of stacked CMOS image sensors is complex and involves bonding multiple layers of semiconductors, which can lead to yield loss and production costs. Additionally, the size of the sensors is increasing, which further complicates the manufacturing process.

Furthermore, as the resolution and sensitivity of the sensors continue to increase, there is a need for advanced image processing algorithms to handle the large amounts of data generated by the sensors. The development of these algorithms requires significant resources and expertise. The integration of stacked CMOS image sensors with other technologies such as artificial intelligence, augmented reality, and virtual reality is also becoming increasingly important. However, this integration requires significant hardware and software developments, and poses additional challenges related to power consumption, size, and compatibility.

Finally, the stacking of multiple wafers can cause light absorption and reflection, resulting in reduced image quality. Therefore, innovative solutions are necessary to minimize these effects and improve the overall image quality. Additionally, the increased integration of components in a small form factor can result in electrical noise, which can affect the device's sensitivity and signal-to-noise ratio. Advanced circuit design and noise reduction techniques are necessary to mitigate this issue.

The stacked CMOS image sensor technology faces challenges related to thermal noise, manufacturing process, image processing, and integration with other technologies. These challenges require significant research and development efforts to overcome and advance the capabilities of stacked CMOS image sensors.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, dimensions of the various features may be arbitrarily increased or reduced for clarity of discussion.

FIG. 11 includes parts (d)-(f), parts (d)-(f) of FIG. 11 are top views of the gull-wing type metal-insulator-metal capacitors of parts (a)-(c) of FIG. 11, in accordance with some embodiments of the present disclosure.

DETAILED DESCRIPTION

Figure 1:
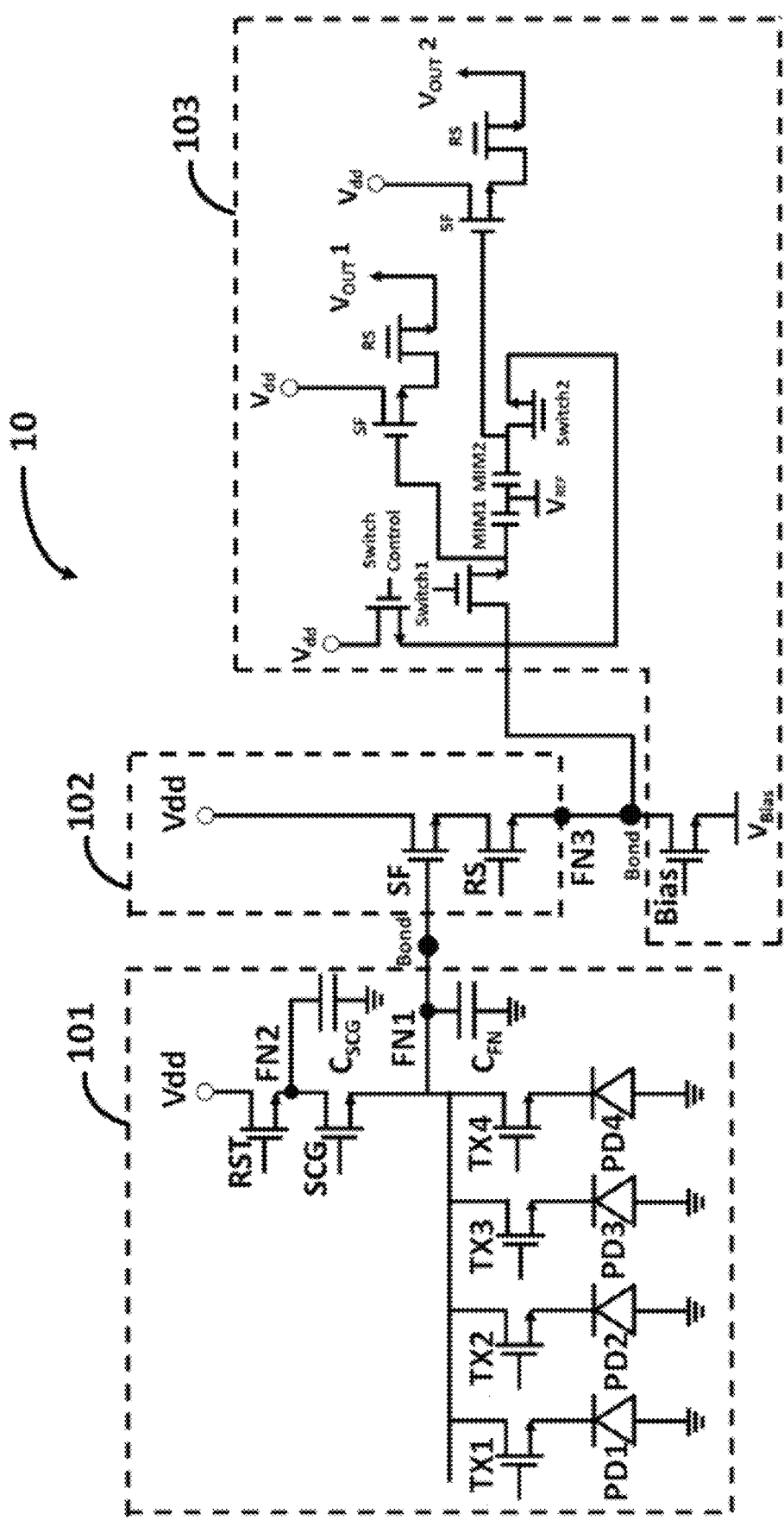
FIG. 1 is a schematic diagram of a stacked CIS structure, in accordance with some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context. In addition, the term "source/drain region" or "source/drain regions" may refer to a source or a drain, individually or collectively dependent upon the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from normal deviation found in the respective testing measurements. Also, as used herein, the terms "substantially," "approximately" and "about" generally mean within a value or range that can be contemplated by people having ordinary skill in the art. Alternatively, the terms "substantially." "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the terms "substantially." "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Stacked CMOS image sensors have been widely used in various applications due to their high resolution and sensitivity. However, the limited area of the top wafer/die in the stacked structure has become a bottleneck for further improvement of the sensor's performance since the inputted light have to pass through multiple layers of the top wafer/die before reaching the photo sensing devices (e.g., photodiodes) in the top wafer/die. To address this issue, a new approach has been proposed to increase the photosensitive area of the top wafer/die by reducing the number of devices in it. This approach can significantly enhance the light-gathering efficiency of the stacked CMOS image sensors, leading to better image quality and higher sensitivity.

The reduction of the number of devices in the top wafer/die can be achieved by optimizing the design of the sensor's circuitry. By carefully rearranging the devices to a different wafer/die, the number of the devices in the top wafer/die can be reduced while maintaining its functionality. This approach not only increases the photo sensing area of the top wafer/die but also reduces the noise of the sensor, resulting in a more efficient and reliable imaging system.

The proposed approach has great potential for improving the performance of stacked CMOS image sensors in various applications, such as digital cameras, smartphones, and medical imaging devices. With the increasing demand for high-quality imaging in these fields, the development of more efficient and reliable sensors has become a critical task for the industry. The proposed approach provides a promising solution to this challenge and opens up new opportunities for the advancement of imaging technology.

FIG. 1 is a schematic diagram of a stacked CIS structure, in accordance with some embodiments of the present disclosure. In some embodiments of the present disclosure, a stacked CMOS image sensor (CIS) structure 10 comprises: a first die 101, a second die 102 and a third die 103.

The first die 101 comprises: a photodiode PD1, a transfer gate TX1, a selective conversion gain (SCG) switch SCG, a reset switch RST, a floating node diffusion capacitor $C_{FN}$, and a SCG diffusion capacitor $C_{SCG}$. The photodiode PD1 comprises an anode electrically connected to a first reference voltage (e.g., ground voltage) and a cathode. The transfer gate TX1 comprises a first terminal electrically connected to the cathode of the photodiode PD1 and a second terminal electrically connected to a first floating node FN1. The SCG switch SCG is electrically connected between the first floating node FN1 and a second floating node FN2. The reset switch RST is electrically connected between the second floating node FN2 and a second reference voltage Vdd. The floating node diffusion capacitor $C_{FN}$ is electrically connected between the first reference voltage and the first floating node FN1. The SCG diffusion capacitor $C_{SCG}$ is electrically connected between the first reference voltage and the second floating node FN2.

The second die 102 comprises: a source follower transistor SF and a row select switch RS. The source follower transistor SF comprising a gate terminal electrically connected to the first floating node FN1, a drain terminal connected to the second reference voltage Vdd and a source terminal. The row select switch RS is connected between the source terminal of the source follower transistor SF and a third floating node FN3.

The third die 103 comprises an image sensing circuit electrically connected to the third floating node FN3. In some embodiments of the present disclosure, the output signal $V_{OUT}1$ of the third die 103 is for high light illuminance, and the output signal $V_{OUT}2$ of the third die 103 is for low light illuminance. Separating the output signals for different light illuminance help to achieve high dynamic range (HDR) for the images captured.

By disposing the source follower transistor SF and the row select switch RS in the second die 102 instead of the first die 101, the light sensing area in the first die 101 can be significantly increased so as to improve the efficiency of the CIS structure for sensing light.

In some embodiments of the present disclosure, the first die 101 is a die diced from an Application Specific Integrated Circuit (ASIC) wafer. In some embodiments of the present disclosure, the second die 102 is a die diced from an ASIC wafer. In some embodiments of the present disclosure, the third die 103 is a die diced from a System-on-Chip (SoC) wafer. In some embodiments of the present disclosure, the second die 102 is a die diced from a SoC wafer.

In some embodiments of the present disclosure, when the SCG switch SCG is in an off state, only the floating node diffusion capacitor $C_{FN}$ is configured to be charged by a current from the photodiode PD1. In some embodiments of the present disclosure, the photodiode PD1 is configured to detect low light illuminance when the SCG switch SCG is in the off state. In some embodiments of the present disclosure, when the SCG switch SCG is in an on state, both the floating node diffusion capacitor $C_{FN}$ and the SCG diffusion capacitor $C_{SCG}$ are configured to be charged by the current from the photodiode PD1. In some embodiments of the present disclosure, the photodiode PD1 is configured to detect high light illuminance when the SCG switch SCG in the on state.

In some embodiments of the present disclosure, the floating node diffusion capacitor $C_{FN}$ comprises a P-N junction formed between a p-type implant and an n-type implant. In some embodiments of the present disclosure, the SCG diffusion capacitor $C_{SCG}$ also comprises a P-N junction formed between a p-type implant and an n-type implant.

In some embodiments of the present disclosure, the first die 101 further comprises a second photodiode PD2 comprising an anode electrically connected to the first reference voltage and a cathode, and a second transfer gate TX2 comprising a first terminal electrically connected to the cathode of the second photodiode PD2 and a second terminal electrically connected to the first floating node FN1. In some embodiments of the present disclosure, the first die 101 further comprises a third photodiode PD3 comprising an anode electrically connected to the first reference voltage and a cathode, and a third transfer gate TX3 comprising a first terminal electrically connected to the cathode of the third photodiode PD3 and a second terminal electrically connected to the first floating node FN1. In some embodiments of the present disclosure, the first die 101 further comprises a fourth photodiode PD4 comprising an anode electrically connected to the first reference voltage and a cathode, and a second transfer gate TX2 comprising a first terminal electrically connected to the cathode of the fourth photodiode PD4 and a second terminal electrically connected to the first floating node FN1.

In some embodiments of the present disclosure, the gate terminal of the source follower transistor SF is electrically connected to the first floating node FN1 through wafer-to-wafer bonding. In some embodiments of the present disclosure, the image sensing circuit is electrically connected to the third floating node FN3 through wafer-to-wafer bonding. In some embodiments of the present disclosure, the second die 102 further comprises a gull-wing type metal-insulator-metal (MIM) capacitor with a prominent bend in the wing inner section towards the wing root. The gull-wing type MIM capacitor will be further introduced in FIG. 11. In some embodiments of the present disclosure, the gull-wing type MIM capacitor in the second die 102 stores charges in-between inter-metal layers to achieve, for example, the global shutter function for a CIS system.

Figure 2:
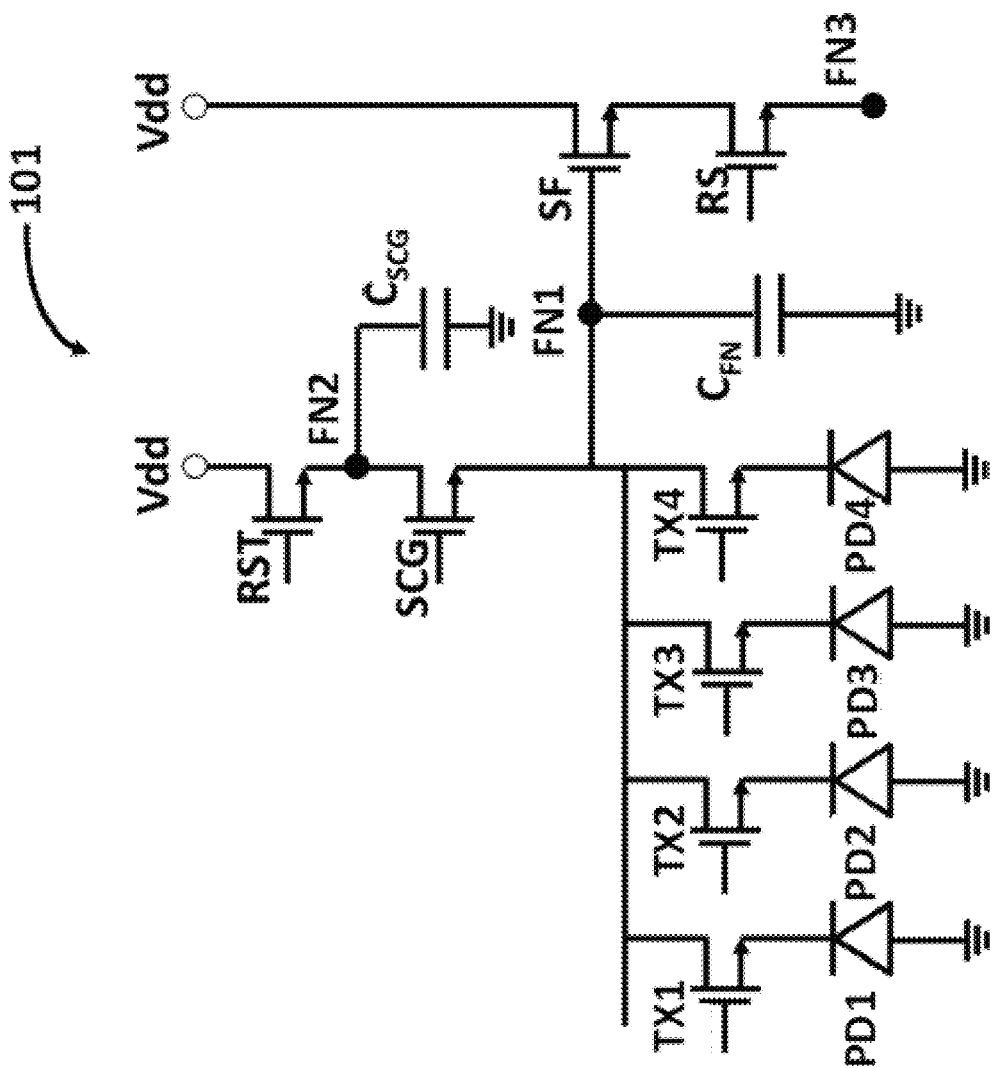
FIG. 2 is a schematic diagram of a switch conversion portion of the stacked CIS structure of FIG. 1, in accordance with some embodiments of the present disclosure.

FIG. 2 is a schematic diagram of a switch conversion portion of the stacked CIS structure of FIG. 1, in accordance with some embodiments of the present disclosure. FIG. 2 illustrates the switch conversion portion of the first die 101 in the stacked CIS structure 10 of FIG. 1. In some embodiments of the present disclosure, while one or more of the photodiodes PD1-PD4 sensing light and the corresponding ones of the transfer gates TX1-TX4 are turned on, the sensed current flows into the floating node FN1 and charges the floating node diffusion capacitor $C_{FN}$. However, in the circumstance of high light illuminance (i.e., the CIS structure is under heavy light), the sensed current may be relatively large, so that the capacitance of the floating node diffusion capacitor $C_{FN}$ itself may not be larger enough for handling the large sensed current. For such circumstance, the SCG switch SCG can be turned on, so that the floating node FN1 and the floating node FN2 are electrically short to each other. The total capacitance at the floating nodes FN1 and FN2 will be the capacitance of the floating node diffusion capacitor $C_{FN}$ plus the capacitance of the SCG diffusion capacitor $C_{SCG}$. Accordingly, the capacitance at the floating nodes FN1 and FN2 can handle larger sensed current so as to successfully handle the circumstance of high light illuminance. The reset switch RST is used to discharge the floating node diffusion capacitor $C_{FN}$ and/or the SCG diffusion capacitor $C_{SCG}$ to prepare for another photo sensing procedure. The source follower SF is used to output the voltage at the floating nodes FN1 without affecting the voltage. Since, in some embodiments of the present disclosure, the stacked CIS structure 10 shown in FIG. 1 may be a row of an image sensing array which includes multiple rows, the row select switch RS is used to select the row currently sensing light.

Figure 3:
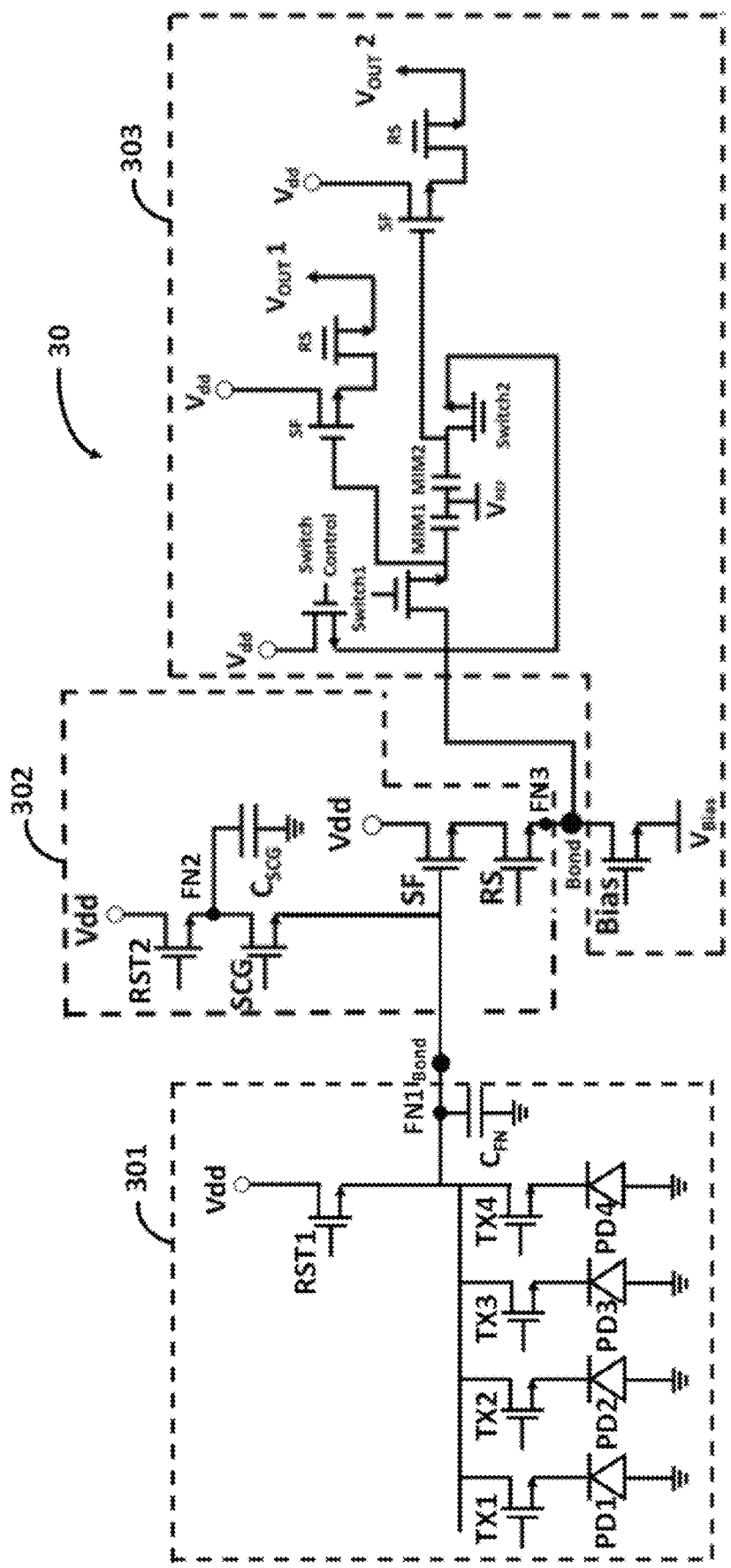
FIG. 3 is a schematic diagram of a stacked CIS structure, in accordance with some embodiments of the present disclosure.

FIG. 3 is a schematic diagram of a stacked CIS structure, in accordance with some embodiments of the present disclosure. In some embodiments of the present disclosure, a stacked CMOS image sensor (CIS) structure 30 comprises: a first die 301, a second die 302 and a third die 303.

The first die 301 comprises: a photodiode PD1, a transfer gate TX1, a first reset switch RST1, and a floating node diffusion capacitor $C_{FN}$. The photodiode PD1 comprises an anode electrically connected to a first reference voltage (e.g., ground voltage) and a cathode. The transfer gate TX1 comprises a first terminal electrically connected to the cathode of the photodiode PD1 and a second terminal electrically connected to a first floating node FN1. The first reset switch RST1 is electrically connected between the first floating node FN1 and a second reference voltage Vdd. The floating node diffusion capacitor $C_{FN}$ is electrically connected between the first reference voltage and the first floating node FN1.

The second die 302 comprises: a SCG switch SCG, a SCG diffusion capacitor $C_{SCG}$, a second reset switch RST2, a source follower transistor SF, and a row select switch RS. The SCG switch SCG is electrically connected between the first floating node FN1 and a second floating node FN2. The SCG diffusion capacitor $C_{SCG}$ is electrically connected between the first reference voltage and the second floating node FN2. The second reset switch RST2 is electrically connected between the second floating node FN2 and the second reference voltage. The source follower transistor SF comprises a gate terminal electrically connected to the first floating node FN1, a drain terminal connected to the second reference voltage Vdd and a source terminal. The row select switch RS is connected between the source terminal of the source follower transistor SF and a third floating node FN3.

The third die 303 comprises an image sensing circuit electrically connected to the third floating node FN3. In some embodiments of the present disclosure, the output signal $V_{OUT}1$ of the third die 303 is for high light illuminance, and the output signal $V_{OUT}2$ of the third die 303 is for low light illuminance. Separating the output signals for different light illuminance help to achieve HDR for the images captured.

By disposing the source follower transistor SF and the row select switch RS in the second die 302 instead of the first die 301, the light sensing area in the first die 301 can be significantly increased so as to improve the efficiency of the CIS structure for sensing light. Additionally, the SCG switch SCG and the SCG diffusion capacitor $C_{SCG}$ are also disposed in the second die 302 instead of the first die 301, so that the light sensing area in the first die 301 can be further increased so as to further improve the efficiency of the CIS structure for sensing light.

In some embodiments of the present disclosure, the first die 301 is a die diced from an ASIC wafer. In some embodiments of the present disclosure, the second die 302 is a die diced from an ASIC wafer. In some embodiments of the present disclosure, the third die 303 is a die diced from a SoC wafer. In some embodiments of the present disclosure, the second die 302 is a die diced from a SoC wafer.

In some embodiments of the present disclosure, when the SCG switch SCG is in an off state, only the floating node diffusion capacitor $C_{FN}$ is configured to be charged by a current from the photodiode PD1. In some embodiments of the present disclosure, the photodiode PD1 is configured to detect low light illuminance when the SCG switch SCG is in the off state. In some embodiments of the present disclosure, when the SCG switch SCG is in an on state, both the floating node diffusion capacitor $C_{FN}$ and the SCG diffusion capacitor $C_{SCG}$ are configured to be charged by the current from the photodiode PD1. In some embodiments of the present disclosure, the photodiode PD1 is configured to detect high light illuminance when the SCG switch SCG is in the on state.

In some embodiments of the present disclosure, the floating node diffusion capacitor $C_{FN}$ comprises a P-N junction formed between a p-type implant and an n-type implant. In some embodiments of the present disclosure, the SCG diffusion capacitor $C_{SCG}$ also comprises a P-N junction formed between a p-type implant and an n-type implant.

In some embodiments of the present disclosure, the first die 301 further comprises a second photodiode PD2 comprising an anode electrically connected to the first reference voltage and a cathode, and a second transfer gate TX2 comprising a first terminal electrically connected to the cathode of the second photodiode PD2 and a second terminal electrically connected to the first floating node FN1. In some embodiments of the present disclosure, the first die 301 further comprises a third photodiode PD3 comprising an anode electrically connected to the first reference voltage and a cathode, and a third transfer gate TX3 comprising a first terminal electrically connected to the cathode of the third photodiode PD3 and a second terminal electrically connected to the first floating node FN1. In some embodiments of the present disclosure, the first die 301 further comprises a fourth photodiode PD4 comprising an anode electrically connected to the first reference voltage and a cathode, and a second transfer gate TX2 comprising a first terminal electrically connected to the cathode of the fourth photodiode PD4 and a second terminal electrically connected to the first floating node FN1.

In some embodiments of the present disclosure, the gate terminal of the source follower transistor SF is electrically connected to the first floating node FN1 through wafer-to-wafer bonding. In some embodiments of the present disclosure, the image sensing circuit is electrically connected to the third floating node FN3 through wafer-to-wafer bonding. In some embodiments of the present disclosure, the second die 102 further comprises a gull-wing type metal-insulator-metal (MIM) capacitor with a prominent bend in the wing inner section towards the wing root. The gull-wing type MIM capacitor will be further introduced in FIG. 11. In some embodiments of the present disclosure, the gull-wing type MIM capacitor in the second die 302 stores charges in-between inter-metal layers to achieve, for example, the global shutter function for a CIS system.

Figure 4:
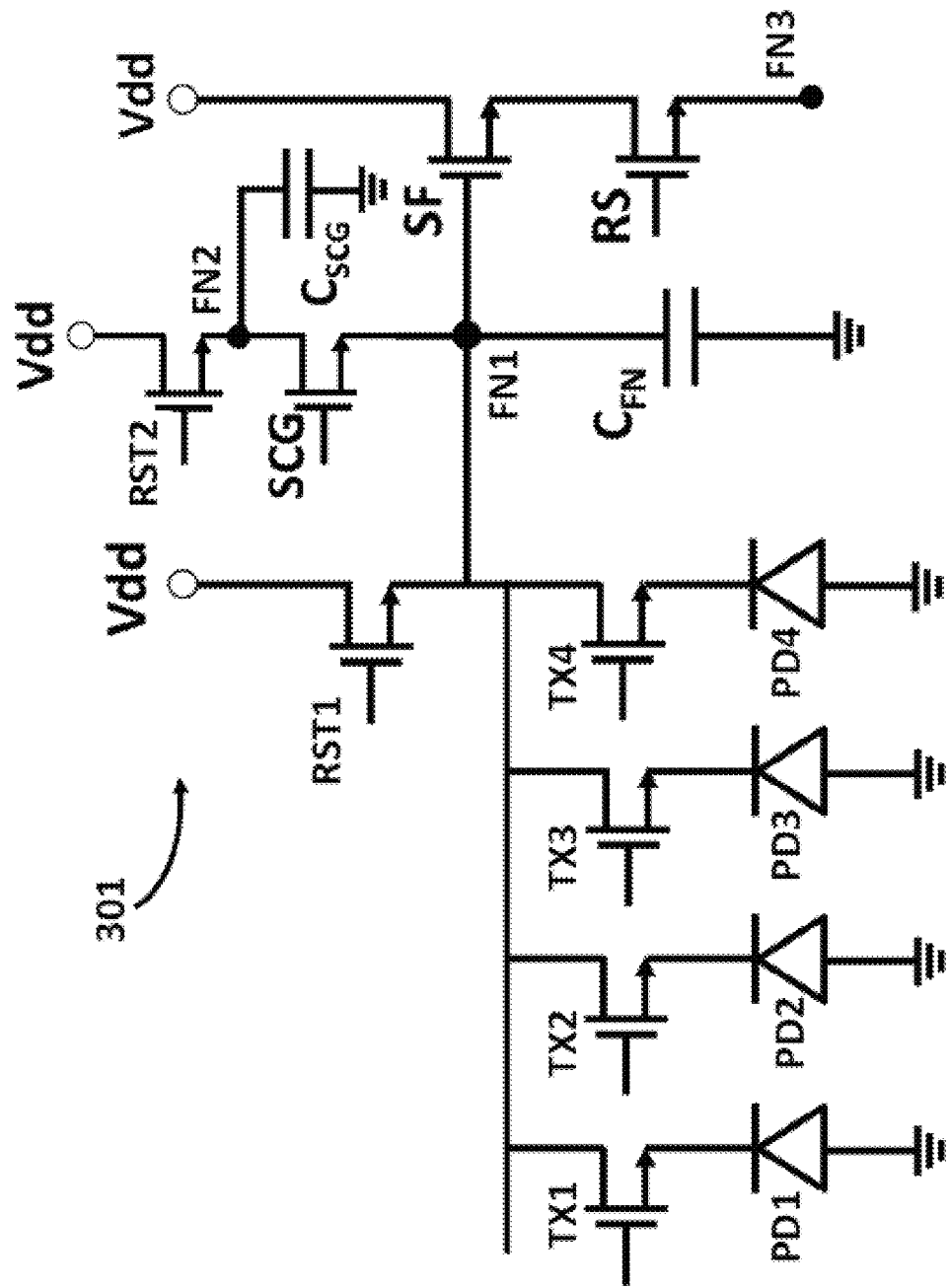
FIG. 4 is a schematic diagram of a switch conversion portion of the stacked CIS structure of FIG. 3, in accordance with some embodiments of the present disclosure.

FIG. 4 is a schematic diagram of a switch conversion portion of the stacked CIS structure of FIG. 3, in accordance with some embodiments of the present disclosure. FIG. 4 illustrates the switch conversion portion of the first die 301 in the stacked CIS structure 30 of FIG. 3. In some embodiments of the present disclosure, while one or more of the photodiodes PD1-PD4 sensing light and the corresponding ones of the transfer gates TX1-TX4 are turned on, the sensed current flows into the floating node FN1 and charges the floating node diffusion capacitor $C_{FN}$. However, in the circumstance of high light illuminance (i.e., the CIS structure is under heavy light), the sensed current may be relatively large, so that the capacitance of the floating node diffusion capacitor $C_{FN}$ itself may not be larger enough for handling the large sensed current. For such circumstance, the SCG switch SCG can be turned on, so that the floating node FN1 and the floating node FN2 are electrically short to each other. The total capacitance at the floating nodes FN1 and FN2 will be the capacitance of the floating node diffusion capacitor $C_{FN}$ plus the capacitance of the SCG diffusion capacitor $C_{SCG}$. Accordingly, the capacitance at the floating nodes FN1 and FN2 can handle larger sensed current so as to successfully handle the circumstance of high light illuminance. The reset switch RST1 is used to discharge the floating node diffusion capacitor $C_{FN}$ to prepare for another photo sensing procedure. The reset switch RST2 is used to discharge the SCG diffusion capacitor $C_{SCG}$ to prepare for another photo sensing procedure. The source follower SF is used to output the voltage at the floating nodes FN1 without affecting the voltage. Since, in some embodiments of the present disclosure, the stacked CIS structure 30 shown in FIG. 3 may be a row of an image sensing array which includes multiple rows, the row select switch RS is used to select the row currently sensing light.

Figure 5:
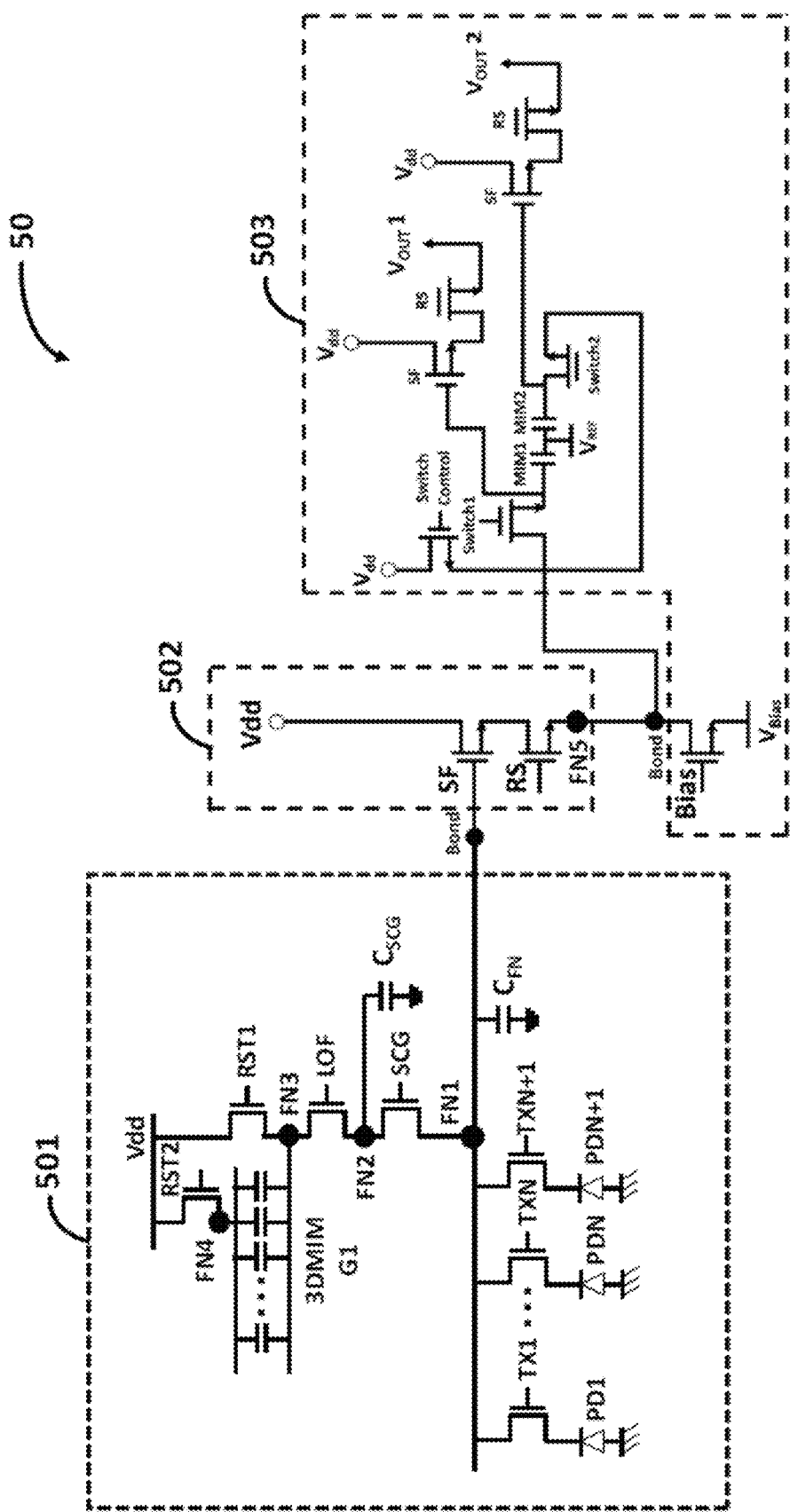
FIG. 5 is a schematic diagram of a stacked CIS structure, in accordance with some embodiments of the present disclosure.

FIG. 5 is a schematic diagram of a stacked CIS structure, in accordance with some embodiments of the present disclosure. In some embodiments of the present disclosure, a stacked CMOS image sensor (CIS) structure 50 comprises: a first die 501, a second die 502 and a third die 503.

The first die 501 comprises: a photodiode PD1, a transfer gate TX1, a floating node diffusion capacitor $C_{FN}$, a selective conversion gain (SCG) switch SCG, a SCG diffusion capacitor $C_{SCG}$, a lateral overflow (LOF) switch LOF, a first rest switch RST1, a second reset switch RST2, and a 3D metal metal-insulator-metal capacitor 3DMIM G1. The photodiode PD1 comprises an anode electrically connected to a first reference voltage (e.g., ground voltage) and a cathode. The transfer gate TX1 comprises a first terminal electrically connected to the cathode of the photodiode PD1 and a second terminal electrically connected to a first floating node FN1. The floating node diffusion capacitor $C_{FN}$ is electrically connected between the first reference voltage and the first floating node FN1. The SCG switch SCG is electrically connected between the first floating node FN1 and a second floating node FN2. The SCG diffusion capacitor $C_{SCG}$ is electrically connected between the first reference voltage and the second floating node FN2. The LOF switch LOF is electrically connected between the second floating node and a third floating node FN3. The first reset switch RST1 is electrically connected between the third floating node FN3 and a second reference voltage Vdd. The second reset switch RST2 is electrically connected between a fourth floating node FN4 and the second reference voltage Vdd. The 3D metal-insulator-metal capacitor 3DMIM G1 is electrically connected between the third floating node FN3 and the fourth floating node FN4.

The second die 502 comprises: a source follower transistor SF and a row select switch RS. The source follower transistor SF comprises a gate terminal electrically connected to the first floating node FN1, a drain terminal connected to the second reference voltage Vdd and a source terminal. The row select switch RS is connected between the source terminal of the source follower transistor SF and a fifth floating node FN5.

The third die 503 comprises an image sensing circuit electrically connected to the fifth floating node FN5. In some embodiments of the present disclosure, the output signal $V_{OUT}1$ of the third die 503 is for high light illuminance, and the output signal $V_{OUT}2$ of the third die 503 is for low light illuminance. Separating the output signals for different light illuminance help to achieve HDR for the images captured.

By disposing the source follower transistor SF and the row select switch RS in the second die 502 instead of the first die 501, the light sensing area in the first die 501 can be significantly increased so as to improve the efficiency of the CIS structure for sensing light.

In some embodiments of the present disclosure, even when the transfer gates TX1-TXN+1 are turned off, the sensed current from the photodiodes PD1-PDN+1 may still overflow to the 3D metal-insulator-metal capacitor 3DMIM G1 if the LOF switch LOF is turned on. The overflowed charges stored on the 3D metal-insulator-metal capacitor 3DMIM G1 may be sensed at the firth floating node FN5 by turning off the transfer gates TX1-TXN+1 and turning the on the LOF switch LOF.

In some embodiments of the present disclosure, the first die 501 is a die diced from an ASIC wafer. In some embodiments of the present disclosure, the second die 502 is a die diced from an ASIC wafer. In some embodiments of the present disclosure, the third die 503 is a die diced from a SoC wafer. In some embodiments of the present disclosure, the second die 502 is a die diced from a SoC wafer.

In some embodiments of the present disclosure, when the SCG switch SCG is in an off state, only the floating node diffusion capacitor $C_{FN}$ is configured to be charged by a current from the photodiode PD1. In some embodiments of the present disclosure, the photodiode PD1 is configured to detect low light illuminance when the SCG switch SCG is in the off state. In some embodiments of the present disclosure, when the SCG switch SCG is in an on state, both the floating node diffusion capacitor $C_{FN}$ and the SCG diffusion capacitor $C_{SCG}$ are configured to be charged by the current from the photodiode PD1. In some embodiments of the present disclosure, the photodiode PD1 is configured to detect high light illuminance when the SCG switch SCG is in the on state.

In some embodiments of the present disclosure, the floating node diffusion capacitor $C_{FN}$ comprises a P-N junction formed between a p-type implant and an n-type implant. In some embodiments of the present disclosure, the SCG diffusion capacitor $C_{SCG}$ also comprises a P-N junction formed between a p-type implant and an n-type implant.

In some embodiments of the present disclosure, the first die 101 further comprises another photodiodes PDN comprising an anode electrically connected to the first reference voltage and a cathode, and another transfer gate TXN comprising a first terminal electrically connected to the cathode of the photodiode PDN and a second terminal electrically connected to the first floating node FN1. In some embodiments of the present disclosure, the first die 501 further comprises another photodiode PDN+1 comprising an anode electrically connected to the first reference voltage and a cathode, and another transfer gate TXN+1 comprising a first terminal electrically connected to the cathode of the photodiode PDN and a second terminal electrically connected to the first floating node FN1.

In some embodiments of the present disclosure, the gate terminal of the source follower transistor SF is electrically connected to the first floating node FN1 through wafer-to-wafer bonding. In some embodiments of the present disclosure, the image sensing circuit is electrically connected to the fifth floating node FN5 through wafer-to-wafer bonding. In some embodiments of the present disclosure, the second die 502 further comprises a gull-wing type metal-insulator-metal (MIM) capacitor with a prominent bend in the wing inner section towards the wing root. The gull-wing type MIM capacitor will be further introduced in FIG. 11. In some embodiments of the present disclosure, the gull-wing type MIM capacitor in the second die 502 stores charges in-between inter-metal layers to achieve, for example, the global shutter function for a CIS system.

Figure 6:
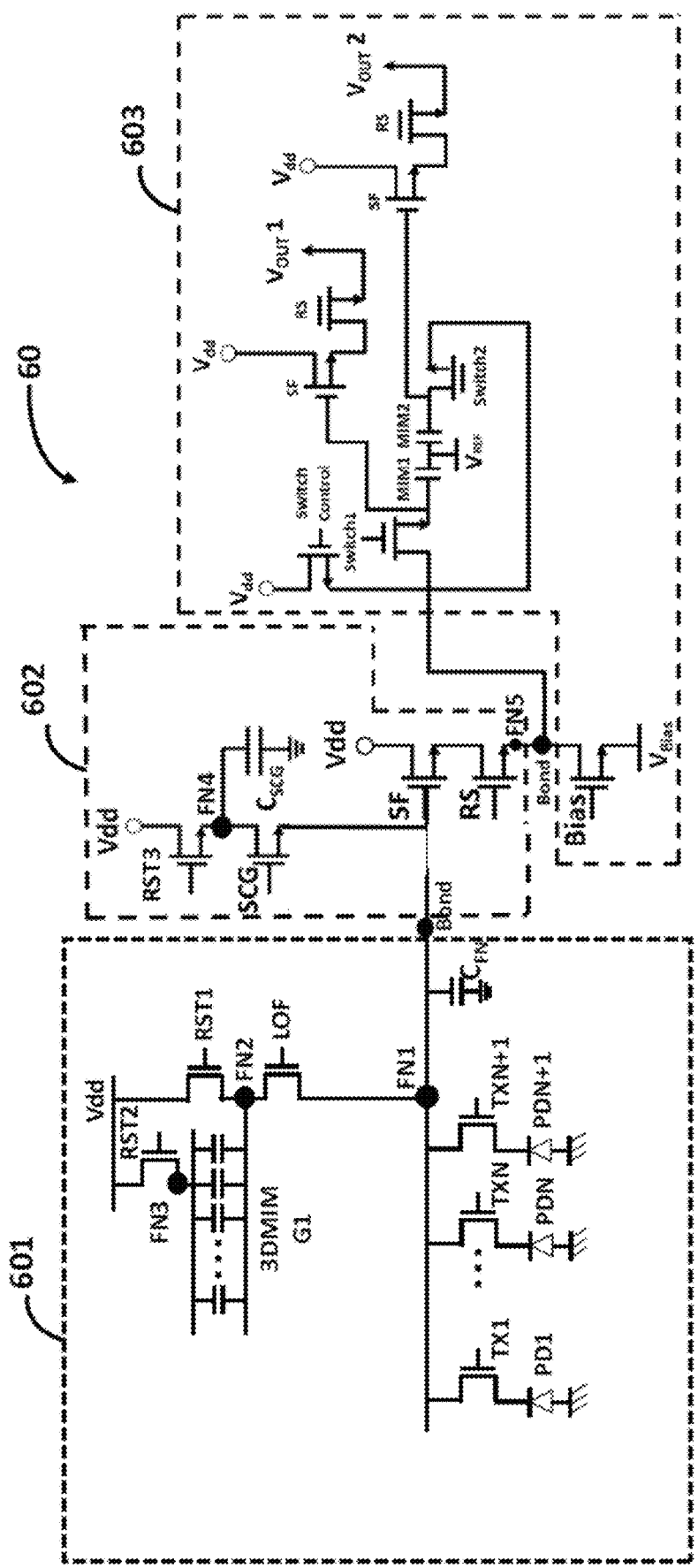
FIG. 6 is a schematic diagram of a stacked CIS structure, in accordance with some embodiments of the present disclosure.

FIG. 6 is a schematic diagram of a stacked CIS structure, in accordance with some embodiments of the present disclosure. In some embodiments of the present disclosure, a stacked CMOS image sensor (CIS) structure 60 comprises: a first die 601, a second die 602 and a third die 603.

The first die 601 comprises: a photodiode PD1, a transfer gate TX1, a floating node diffusion capacitor $C_{FN}$, a lateral overflow (LOF) switch LOF, a first rest switch RST1, a second reset switch RST2, and a 3D metal metal-insulator-metal capacitor 3DMIM G1. The photodiode PD1 comprises an anode electrically connected to a first reference voltage (e.g., ground voltage) and a cathode. The transfer gate TX1 comprises a first terminal electrically connected to the cathode of the photodiode PD1 and a second terminal electrically connected to a first floating node FN1. The floating node diffusion capacitor $C_{FN}$ is electrically connected between the first reference voltage and the first floating node FN1. The LOF switch LOF is electrically connected between the second floating node and a second floating node FN2. The first reset switch RST1 is electrically connected between the second floating node FN2 and a second reference voltage Vdd. The second reset switch RST2 is electrically connected between a third floating node FN3 and the second reference voltage Vdd. The 3D metal-insulator-metal capacitor 3DMIM G1 is electrically connected between the second floating node FN2 and the third floating node FN3.

The second die 602 comprises: a SCG switch SCG, a SCG diffusion capacitor $C_{SCG}$, a third reset switch RST3, a source follower transistor SF, and a row select switch RS. The SCG switch SCG is electrically connected between the first floating node FN1 and a fourth floating node FN4. The SCG diffusion capacitor $C_{SCG}$ is electrically connected between the first reference voltage and the fourth floating node FN4. The third reset switch RST3 is electrically connected between the fourth floating node FN4 and the second reference voltage Vdd. The source follower transistor SF comprises a gate terminal electrically connected to the first floating node FN1, a drain terminal connected to the second reference voltage Vdd and a source terminal. The row select switch RS is connected between the source terminal of the source follower transistor SF and a fifth floating node FN5.

The third die 603 comprises an image sensing circuit electrically connected to the fifth floating node FN5. In some embodiments of the present disclosure, the output signal $V_{OUT}1$ of the third die 603 is for high light illuminance, and the output signal $V_{OUT}2$ of the third die 603 is for low light illuminance. Separating the output signals for different light illuminance help to achieve HDR for the images captured.

By disposing the source follower transistor SF and the row select switch RS in the second die 602 instead of the first die 601, the light sensing area in the first die 601 can be significantly increased so as to improve the efficiency of the CIS structure for sensing light. Additionally, the SCG switch SCG and the SCG diffusion capacitor $C_{SCG}$ are also disposed in the second die 602 instead of the first die 601, so that the light sensing area in the first die 601 can be further increased so as to further improve the efficiency of the CIS structure for sensing light.

In some embodiments of the present disclosure, even when the transfer gates TX1-TXN+1 are turned off, the sensed current from the photodiodes PD1-PDN+1 may still overflow to the 3D metal-insulator-metal capacitor 3DMIM G1 if the LOF switch LOF is turned on. The overflowed charges stored on the 3D metal-insulator-metal capacitor 3DMIM G1 may be sensed at the fifth floating node FN5 by turning off the transfer gates TX1-TXN+1 and turning the on the LOF switch LOF.

In some embodiments of the present disclosure, the first die 601 is a die diced from an ASIC wafer. In some embodiments of the present disclosure, the second die 602 is a die diced from an ASIC wafer. In some embodiments of the present disclosure, the third die 603 is a die diced from a SoC wafer. In some embodiments of the present disclosure, the second die 602 is a die diced from a SoC wafer.

In some embodiments of the present disclosure, when the SCG switch SCG is in an off state, only the floating node diffusion capacitor $C_{FN}$ is configured to be charged by a current from the photodiode PD1. In some embodiments of the present disclosure, the photodiode PD1 is configured to detect low light illuminance when the SCG switch SCG is in the off state. In some embodiments of the present disclosure, when the SCG switch SCG is in an on state, both the floating node diffusion capacitor $C_{FN}$ and the SCG diffusion capacitor $C_{SCG}$ are configured to be charged by the current from the photodiode PD1. In some embodiments of the present disclosure, the photodiode PD1 is configured to detect high light illuminance when the SCG switch SCG is in the on state.

In some embodiments of the present disclosure, the floating node diffusion capacitor $C_{FN}$ comprises a P-N junction formed between a p-type implant and an n-type implant. In some embodiments of the present disclosure, the SCG diffusion capacitor $C_{SCG}$ also comprises a P-N junction formed between a p-type implant and an n-type implant.

In some embodiments of the present disclosure, the first die 101 further comprises another photodiodes PDN comprising an anode electrically connected to the first reference voltage and a cathode, and another transfer gate TXN comprising a first terminal electrically connected to the cathode of the photodiode PDN and a second terminal electrically connected to the first floating node FN1. In some embodiments of the present disclosure, the first die 601 further comprises another photodiode PDN+1 comprising an anode electrically connected to the first reference voltage and a cathode, and another transfer gate TXN+1 comprising a first terminal electrically connected to the cathode of the photodiode PDN and a second terminal electrically connected to the first floating node FN1.

In some embodiments of the present disclosure, the gate terminal of the source follower transistor SF is electrically connected to the first floating node FN1 through wafer-to-wafer bonding. In some embodiments of the present disclosure, the image sensing circuit is electrically connected to the fifth floating node FN5 through wafer-to-wafer bonding. In some embodiments of the present disclosure, the second die 602 further comprises a gull-wing type metal-insulator-metal (MIM) capacitor with a prominent bend in the wing inner section towards the wing root. The gull-wing type MIM capacitor will be further introduced in FIG. 11. In some embodiments of the present disclosure, the gull-wing type MIM capacitor in the second die 602 stores charges in-between inter-metal layers to achieve, for example, the global shutter function for a CIS system.

Figure 7:
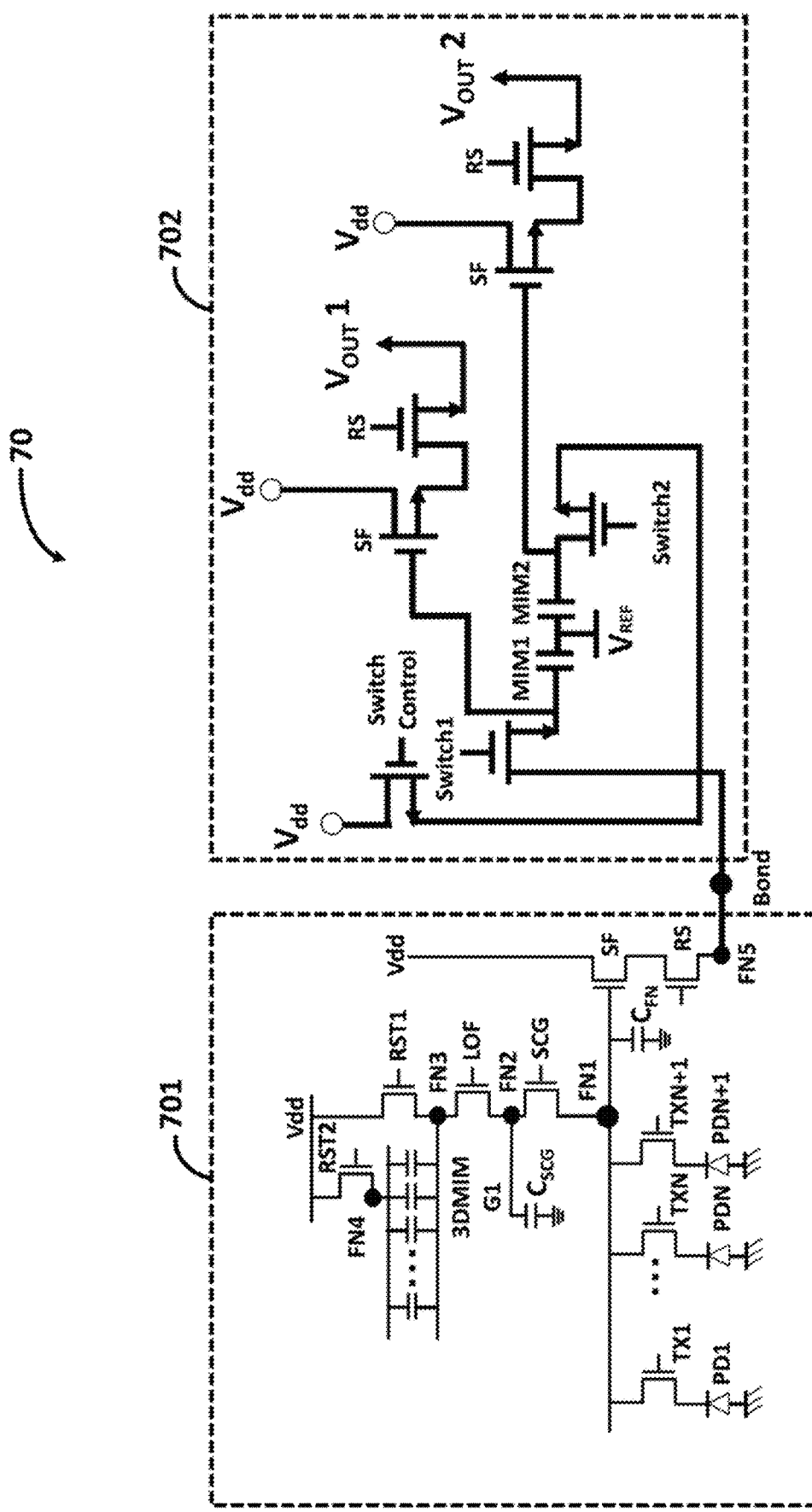
FIG. 7 is a schematic diagram of a stacked CIS structure, in accordance with some embodiments of the present disclosure.

FIG. 7 is a schematic diagram of a stacked CIS structure, in accordance with some embodiments of the present disclosure. In some embodiments of the present disclosure, a stacked CMOS image sensor (CIS) structure 70 comprises: a first die 701 and a second die 702.

The first die 701 comprises: a photodiode PD1, a transfer gate TX1, a floating node diffusion capacitor $C_{FN}$, a selective conversion gain (SCG) switch SCG, a SCG diffusion capacitor $C_{SCG}$, a lateral overflow (LOF) switch LOF, a first rest switch RST1, a second reset switch RST2, a 3D metal metal-insulator-metal capacitor 3DMIM G1, a source follower transistor SF, and a row select switch RS. The photodiode PD1 comprises an anode electrically connected to a first reference voltage (e.g., ground voltage) and a cathode. The transfer gate TX1 comprises a first terminal electrically connected to the cathode of the photodiode PD1 and a second terminal electrically connected to a first floating node FN1. The floating node diffusion capacitor $C_{FN}$ is electrically connected between the first reference voltage and the first floating node FN1. The SCG switch SCG is electrically connected between the first floating node FN1 and a second floating node FN2. The SCG diffusion capacitor $C_{SCG}$ is electrically connected between the first reference voltage and the second floating node FN2. The LOF switch LOF is electrically connected between the second floating node and a third floating node FN3. The first reset switch RST1 is electrically connected between the third floating node FN3 and a second reference voltage Vdd. The second reset switch RST2 is electrically connected between a fourth floating node FN4 and the second reference voltage Vdd. The 3D metal-insulator-metal capacitor 3DMIM G1 is electrically connected between the third floating node FN3 and the fourth floating node FN4. The source follower transistor SF comprises a gate terminal electrically connected to the first floating node FN1, a drain terminal connected to the second reference voltage Vdd and a source terminal. The row select switch RS is connected between the source terminal of the source follower transistor SF and a fifth floating node FN5.

The second die 702 comprises an image sensing circuit electrically connected to the fifth floating node FN5. In some embodiments of the present disclosure, the output signal $V_{OUT}1$ of the second die 702 is for high light illuminance, and the output signal $V_{OUT}2$ of the second die 702 is for low light illuminance. Separating the output signals for different light illuminance help to achieve HDR for the images captured.

In some embodiments of the present disclosure, even when the transfer gates TX1-TXN+1 are turned off, the sensed current from the photodiodes PD1-PDN+1 may still overflow to the 3D metal-insulator-metal capacitor 3DMIM G1 if the LOF switch LOF is turned on. The overflowed charges stored on the 3D metal-insulator-metal capacitor 3DMIM G1 may be sensed at the firth floating node FN5 by turning off the transfer gates TX1-TXN+1 and turning the on the LOF switch LOF.

In some embodiments of the present disclosure, the first die 701 is a die diced from an ASIC wafer. In some embodiments of the present disclosure, the second die 702 is a die diced from a SoC wafer.

In some embodiments of the present disclosure, when the SCG switch SCG is in an off state, only the floating node diffusion capacitor $C_{FN}$ is configured to be charged by a current from the photodiode PD1. In some embodiments of the present disclosure, the photodiode PD1 is configured to detect low light illuminance when the SCG switch SCG is in the off state. In some embodiments of the present disclosure, when the SCG switch SCG is in an on state, both the floating node diffusion capacitor $C_{FN}$ and the SCG diffusion capacitor $C_{SCG}$ are configured to be charged by the current from the photodiode PD1. In some embodiments of the present disclosure, the photodiode PD1 is configured to detect high light illuminance when the SCG switch SCG is in the on state.

In some embodiments of the present disclosure, the floating node diffusion capacitor $C_{FN}$ comprises a P-N junction formed between a p-type implant and an n-type implant. In some embodiments of the present disclosure, the SCG diffusion capacitor $C_{SCG}$ also comprises a P-N junction formed between a p-type implant and an n-type implant.

In some embodiments of the present disclosure, the first die 101 further comprises another photodiodes PDN comprising an anode electrically connected to the first reference voltage and a cathode, and another transfer gate TXN comprising a first terminal electrically connected to the cathode of the photodiode PDN and a second terminal electrically connected to the first floating node FN1. In some embodiments of the present disclosure, the first die 701 further comprises another photodiode PDN+1 comprising an anode electrically connected to the first reference voltage and a cathode, and another transfer gate TXN+1 comprising a first terminal electrically connected to the cathode of the photodiode PDN and a second terminal electrically connected to the first floating node FN1.

In some embodiments of the present disclosure, the gate terminal of the source follower transistor SF is electrically connected to the first floating node FN1 through wafer-to-wafer bonding. In some embodiments of the present disclosure, the image sensing circuit is electrically connected to the fifth floating node FN5 through wafer-to-wafer bonding. In some embodiments of the present disclosure, the first die 701 further comprises a gull-wing type metal-insulator-metal (MIM) capacitor with a prominent bend in the wing inner section towards the wing root. The gull-wing type MIM capacitor will be further introduced in FIG. 11. In some embodiments of the present disclosure, the gull-wing type MIM capacitor in the second die 702 stores charges in-between inter-metal layers to achieve, for example, the global shutter function for a CIS system.

Figure 8:
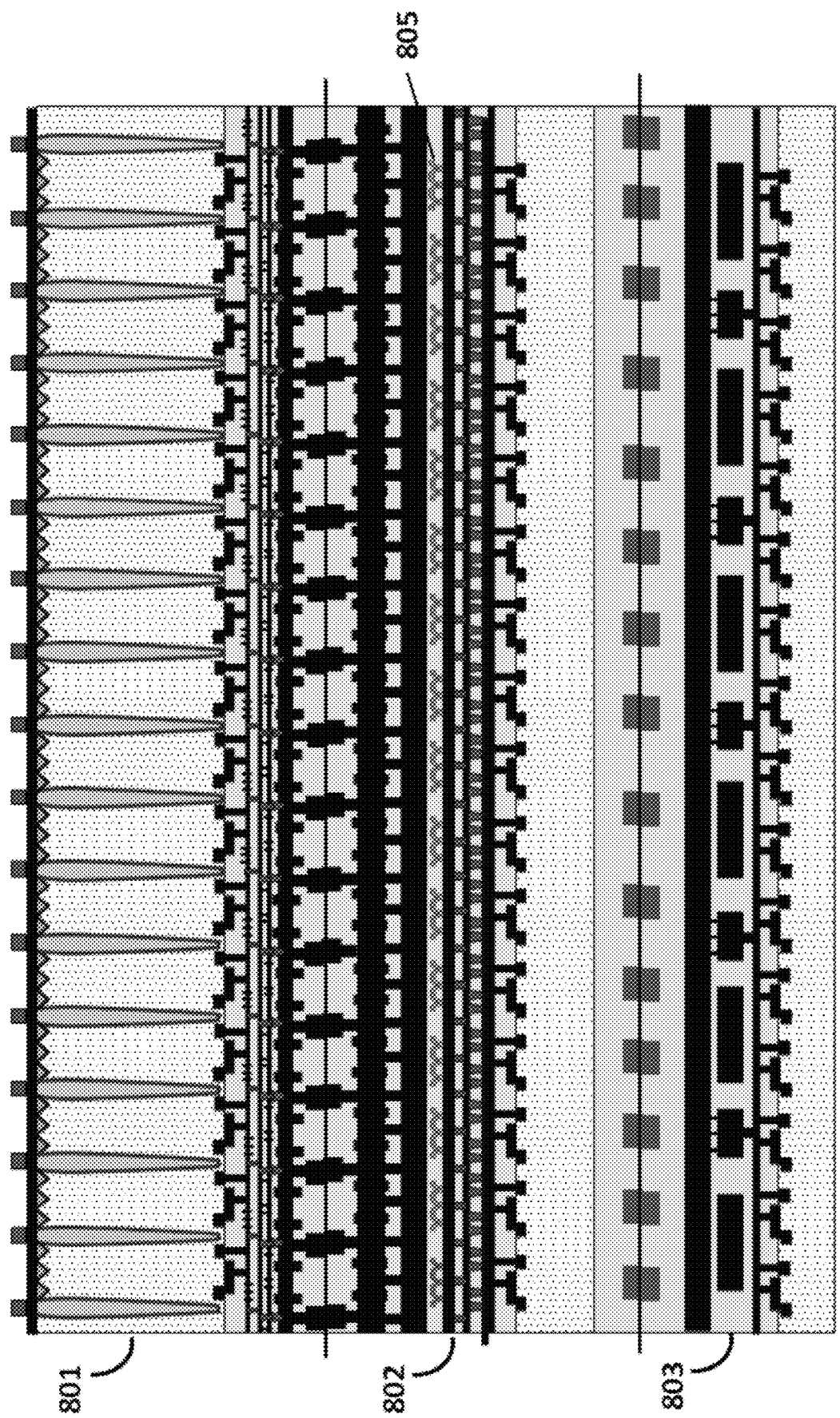
FIG. 8 is a cross-section view of a stacked CIS structure, in accordance with some embodiments of the present disclosure.

FIG. 8 is a cross-section view of a stacked CIS structure, in accordance with some embodiments of the present disclosure.

As shown in FIG. 8, a stacked CIS structure comprises: a first die 801, a second die 802 and a third die 803. In some embodiments of the present disclosure, the first die 801, the second die 802 and the third die 803 correspond to the first die 101, the second die 102 and the third die 103 in FIG. 1, respectively. In some embodiments of the present disclosure, the first die 801, the second die 802 and the third die 803 correspond to the first die 301, the second die 302 and the third die 303 in FIG. 3, respectively. In some embodiments of the present disclosure, the first die 801, the second die 802 and the third die 803 correspond to the first die 501, the second die 502 and the third die 503 in FIG. 5, respectively. In some embodiments of the present disclosure, the first die 801, the second die 802 and the third die 803 correspond to the first die 601, the second die 602 and the third die 603 in FIG. 6, respectively. FIG. 8 further shows that the second die 802 comprises a gull-wing type metal-insulator-metal (MIM) capacitor 805 with a prominent bend in the wing inner section towards the wing root. The gull-wing type MIM capacitor 805 will be further introduced in parts (a) and (d) of FIG. 11.

In some embodiments of the present disclosure, the first die 801 comprises logical circuits, deep trench isolated structures, grid structures and redistribution layers with pads on the bottom surface of the die as bonding surface. In some embodiments of the present disclosure, the second die 802 comprises logical circuits, big through silicon vias, redistribution layers on the top surface for hybrid bonding, and redistribution layers on the bottom surface as bonding surface. In some embodiments of the present disclosure, the pads of the redistribution layers of first die 801 is connected to redistribution layers on the top surface of the second die 802.

In some embodiments of the present disclosure, one of the gates of the transistors in the first die 801 or the second die 802 may be a poly gate, a poly silicide gate, an amorphous gate, an amorphous silicide gate, a vertical transfer gate, doped poly gate, or any types of High-k Metal Gate (HKMG).

In some embodiments of the present disclosure, multiple MIM capacitors or a single MIM capacitor with large surface area is disposed in the second die 802 to ensure that the total capacitance can be much larger than the capacitance required for storing electrons. For a typical RC circuit in steady state, higher capacitance usually means lower kT/C noise.

Figure 9:
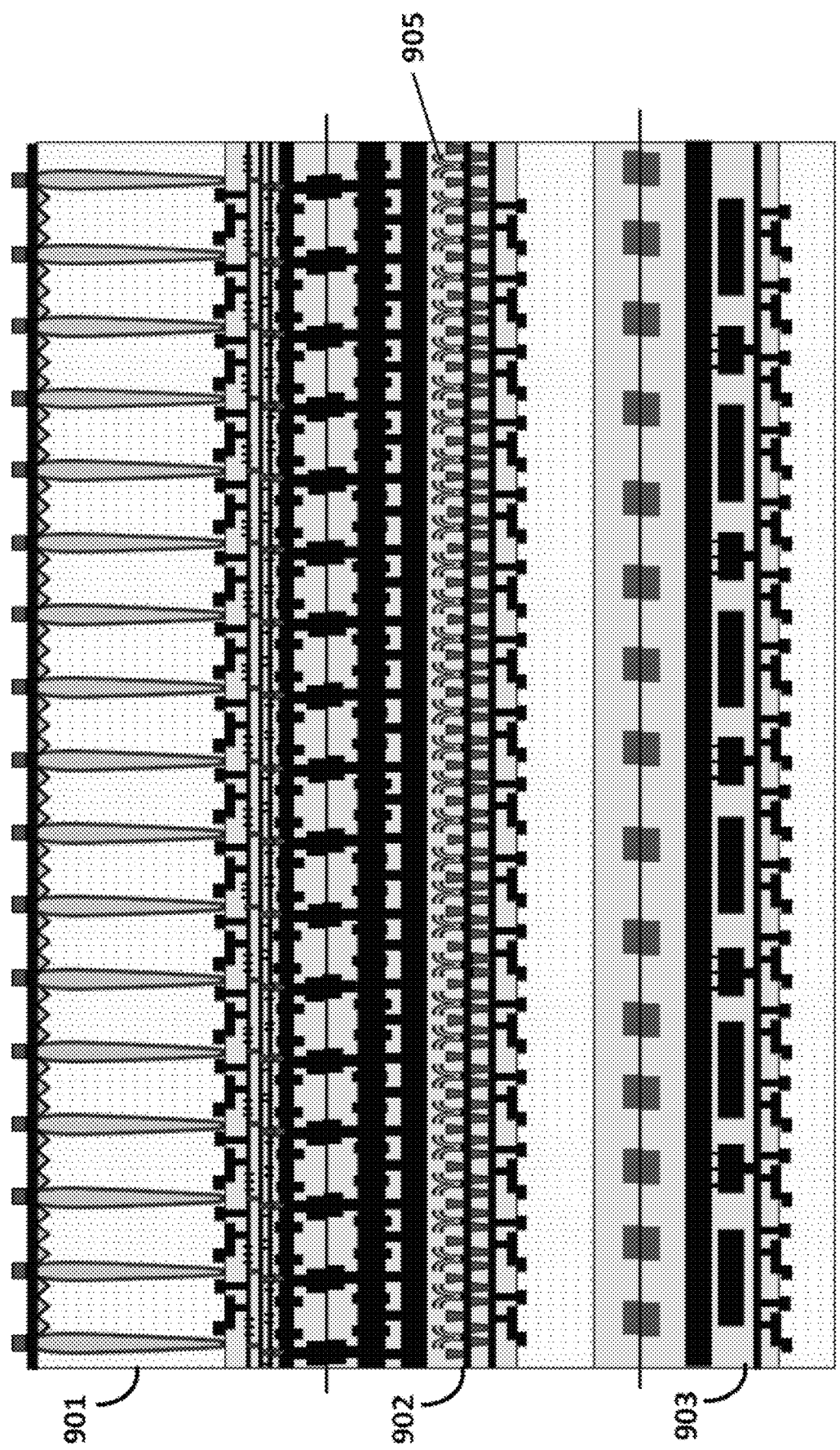
FIG. 9 is a cross-section view of a stacked CIS structure, in accordance with some embodiments of the present disclosure.

FIG. 9 is a cross-section view of a stacked CIS structure, in accordance with some embodiments of the present disclosure.

As shown in FIG. 9, a stacked CIS structure comprises: a first die 901, a second die 902 and a third die 903. In some embodiments of the present disclosure, the first die 901, the second die 902 and the third die 903 correspond to the first die 101, the second die 102 and the third die 103 in FIG. 1, respectively. In some embodiments of the present disclosure, the first die 901, the second die 902 and the third die 903 correspond to the first die 301, the second die 302 and the third die 303 in FIG. 3, respectively. In some embodiments of the present disclosure, the first die 901, the second die 902 and the third die 903 correspond to the first die 501, the second die 502 and the third die 503 in FIG. 5, respectively. In some embodiments of the present disclosure, the first die 901, the second die 902 and the third die 903 correspond to the first die 601, the second die 602 and the third die 603 in FIG. 6, respectively. FIG. 9 further shows that the second die 902 comprises a gull-wing type metal-insulator-metal (MIM) capacitor 905 with a prominent bend in the wing inner section towards the wing root. The gull-wing type MIM capacitor 905 will be further introduced in parts (b) and (c) of FIG. 11.

In some embodiments of the present disclosure, the first die 901 comprises logical circuits, deep trench isolated structures, grid structures and redistribution layers with pads on the bottom surface of the die as bonding surface. In some embodiments of the present disclosure, the second die 902 comprises logical circuits, big through silicon vias, redistribution layers on the top surface for hybrid bonding, and redistribution layers on the bottom surface as bonding surface. In some embodiments of the present disclosure, the pads of the redistribution layers of first die 901 is connected to redistribution layers on the top surface of the second die 902.

In some embodiments of the present disclosure, one of the gates of the transistors in the first die 901 or the second die 902 may be a poly gate, a poly silicide gate, an amorphous gate, an amorphous silicide gate, a vertical transfer gate, doped poly gate, or any types of High-k Metal Gate (HKMG).

In some embodiments of the present disclosure, multiple MIM capacitors or a single MIM capacitor with large surface area is disposed in the second die 902 to ensure that the total capacitance can be much larger than the capacitance required for storing electrons. For a typical RC circuit in steady state, higher capacitance usually means lower kT/C noise.

Figure 10:
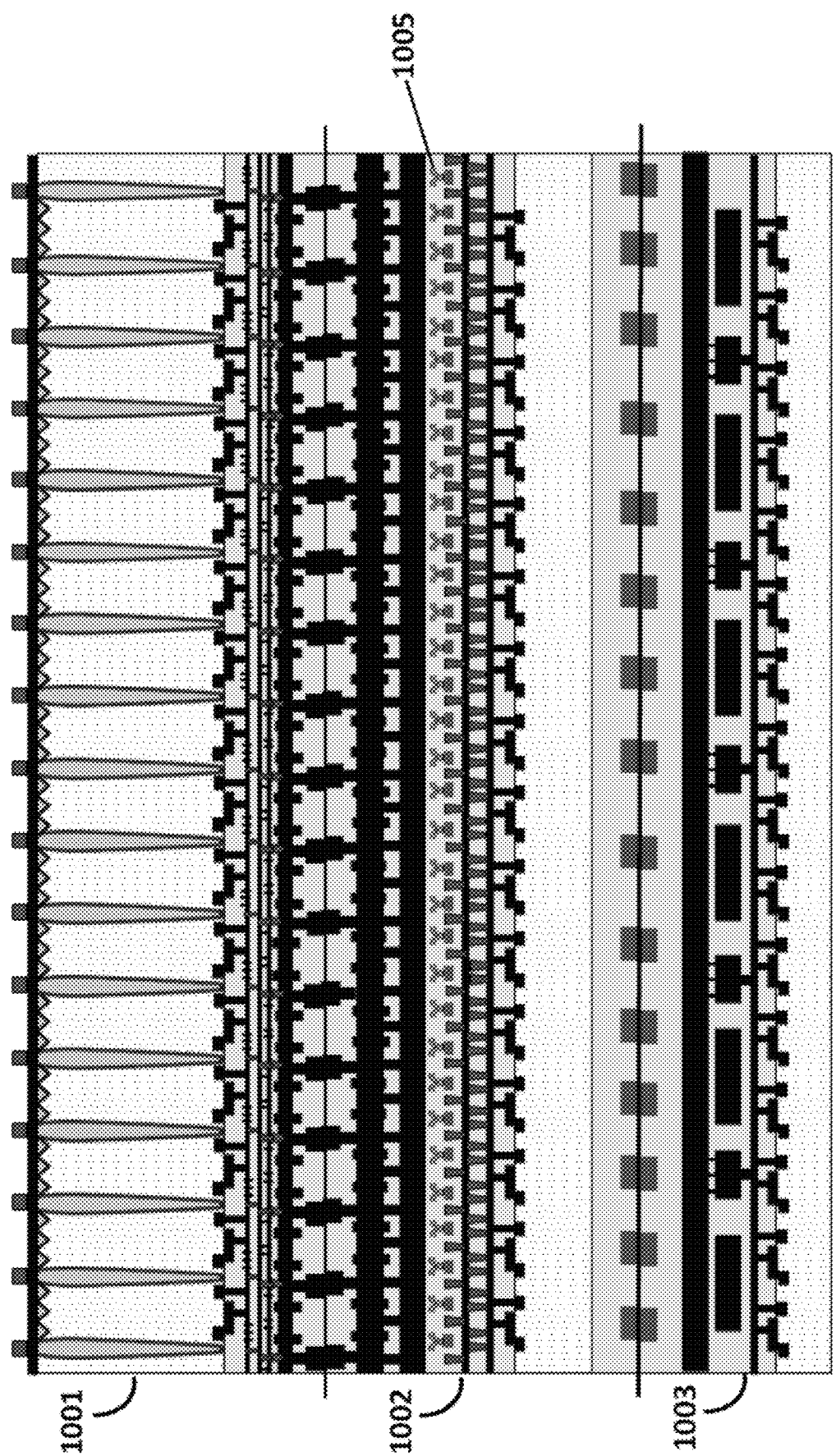
FIG. 10 is a cross-section view of a stacked CIS structure, in accordance with some embodiments of the present disclosure.

FIG. 10 is a cross-section view of a stacked CIS structure, in accordance with some embodiments of the present disclosure.

As shown in FIG. 10, a stacked CIS structure comprises: a first die 1001, a second die 1002 and a third die 1003. In some embodiments of the present disclosure, the first die 1001, the second die 1002 and the third die 903 correspond to the first die 101, the second die 102 and the third die 103 in FIG. 1, respectively. In some embodiments of the present disclosure, the first die 1001, the second die 1002 and the third die 1003 correspond to the first die 301, the second die 302 and the third die 303 in FIG. 3, respectively. In some embodiments of the present disclosure, the first die 1001, the second die 1002 and the third die 1003 correspond to the first die 501, the second die 502 and the third die 503 in FIG. 5, respectively. In some embodiments of the present disclosure, the first die 1001, the second die 1002 and the third die 1003 correspond to the first die 601, the second die 602 and the third die 603 in FIG. 6, respectively. FIG. 10 further shows that the second die 1002 comprises a gull-wing type metal-insulator-metal (MIM) capacitor 1005 with a prominent bend in the wing inner section towards the wing root. The gull-wing type MIM capacitor 1005 will be further introduced in parts (c) and (f) of FIG. 11.

In some embodiments of the present disclosure, the first die 1001 comprises logical circuits, deep trench isolated structures, grid structures and redistribution layers with pads on the bottom surface of the die as bonding surface. In some embodiments of the present disclosure, the second die 1002 comprises logical circuits, big through silicon vias, redistribution layers on the top surface for hybrid bonding, and redistribution layers on the bottom surface as bonding surface. In some embodiments of the present disclosure, the pads of the redistribution layers of first die 1001 is connected to redistribution layers on the top surface of the second die 1002.

In some embodiments of the present disclosure, one of the gates of the transistors in the first die 1001 or the second die 1002 may be a poly gate, a poly silicide gate, an amorphous gate, an amorphous silicide gate, a vertical transfer gate, doped poly gate, or any types of High-k Metal Gate (HKMG).

In some embodiments of the present disclosure, multiple MIM capacitors or a single MIM capacitor with large surface area is disposed in the second die 1002 to ensure that the total capacitance can be much larger than the capacitance required for storing electrons. For a typical RC circuit in steady state, higher capacitance usually means lower kT/C noise.

Figure 11:
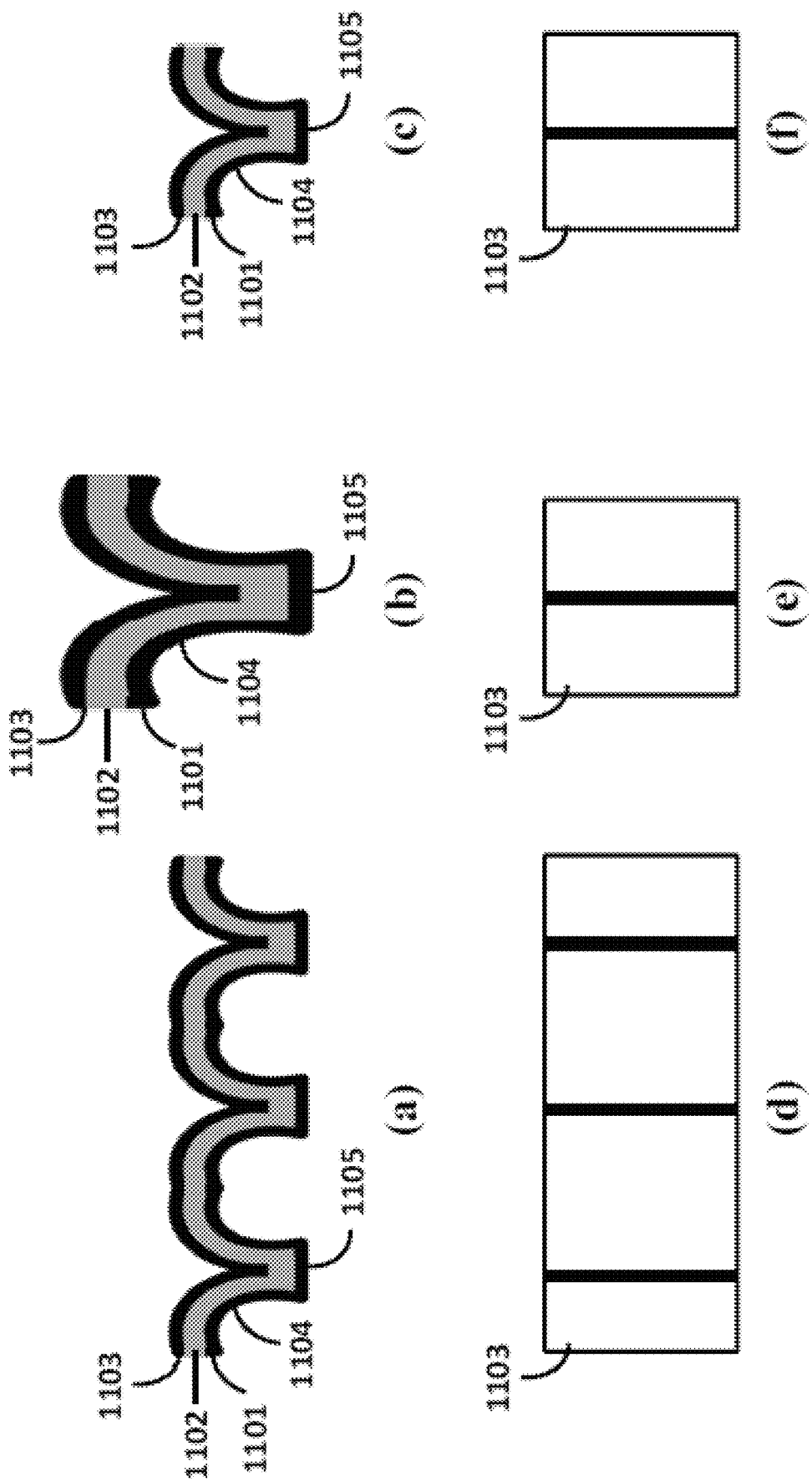
FIG. 11 includes parts (a)-(c), parts (a)-(c) of FIG. 11 are cross-section views of gull-wing type metal-insulator-metal capacitors, in accordance with some embodiments of the present disclosure.

Parts (a)-(c) of FIG. 11 are cross-section views of gull-wing type metal-insulator-metal capacitors, in accordance with some embodiments of the present disclosure.

CMOS image sensors of the stack type may utilize metal-insulator-metal (MIM) in the interlayer insulating layers for the purpose of isolating wiring lines, vertical contacts, and other components. This may pose a challenge in designing the layout of an MIM capacitor within the interlayer insulating layers due to the presence of these additional structures. Additionally, the interlayer insulating layers are generally thin, which makes it challenging to create MIM capacitors with larger sizes.

Part (a) of FIG. 11 shows a cross-section view of a gull-wing type metal-insulator-metal capacitor with three gull-wing units connected in series, each with a wing root 1105 and a wing inner section 1104. Each of the gull-wing units has a prominent bend in the wing inner section 1104 towards the wing root 1105. The gull-wing type metal-insulator-metal capacitor is formed with a top metal layer 1103, an insulator layer 1102 and a bottom metal layer 1101. In some embodiments of the present disclosure, the top metal layer 1103 is a top metal of a die and the bottom metal layer 1101 is the second metal layer (i.e., the metal layer just below the top metal layer) of the die. In some embodiments of the present disclosure, the top metal layer 1103 and the bottom metal layer 1101 may be any two adjacent metal layers in a die. In some embodiments of the present disclosure, the top metal layer 1103 and the bottom metal layer 1101 may be any two metal layers in a die. In some embodiments of the present disclosure, the gull-wing type metal-insulator-metal capacitor may include two gull-wing units. In some embodiments of the present disclosure, the gull-wing type metal-insulator-metal capacitor may include more than three gull-wing units.

Part (b) of FIG. 11 shows a cross-section view of a gull-wing type metal-insulator-metal capacitor with a wing root 1105 and a wing inner section 1104. The gull-wing unit has a prominent bend in the wing inner section 1104 towards the wing root 1105. The gull-wing type metal-insulator-metal capacitor is formed with a top metal layer 1103, an insulator layer 1102 and a bottom metal layer 1101. In some embodiments of the present disclosure, the top metal layer 1103 and the bottom metal layer 1101 may be any two adjacent metal layers in a die. In some embodiments of the present disclosure, the top metal layer 1103 and the bottom metal layer 1101 may be any two metal layers in a die.

Part (c) of FIG. 11 shows a cross-section view of a gull-wing type metal-insulator-metal capacitor with a wing root 1105 and a wing inner section 1104. The gull-wing unit has a prominent bend in the wing inner section 1104 towards the wing root 1105. The gull-wing type metal-insulator-metal capacitor is formed with a top metal layer 1103, an insulator layer 1102 and a bottom metal layer 1101. In some embodiments of the present disclosure, the top metal layer 1103 and the bottom metal layer 1101 may be any two adjacent metal layers in a die. In some embodiments of the present disclosure, the top metal layer 1103 and the bottom metal layer 1101 may be any two metal layers in a die.

In some embodiments of the present disclosure, each of the gull-wing units of the gull-wing type metal-insulator-metal capacitor in part (a) of FIG. 11 is similar to the gull-wing type metal-insulator-metal capacitor in part (c) of FIG. 11. Since the gull-wing units of the gull-wing type metal-insulator-metal capacitor in part (a) of FIG. 11 includes three gull-wing units connected in series, the capacitance of the gull-wing type metal-insulator-metal capacitor in part (a) of FIG. 11 may be around three times of the capacitance of the gull-wing type metal-insulator-metal capacitor in part (c) of FIG. 11.

The difference between part (b) and part (c) of FIG. 11 lies in that the size of the gull-wing type metal-insulator-metal capacitor in part (b) of FIG. 11 is around twice the size of the gull-wing type metal-insulator-metal capacitor in part (c) of FIG. 11. In some embodiments of the present disclosure, the capacitance of the gull-wing type metal-insulator-metal capacitor in part (b) of FIG. 11 is larger than the capacitance of the gull-wing type metal-insulator-metal capacitor in part (c) of FIG. 11. In some embodiments of the present disclosure, since the height of the gull-wing type metal-insulator-metal capacitor in part (b) of FIG. 11 is larger than the height of the gull-wing type metal-insulator-metal capacitor in part (c) of FIG. 11, the gull-wing type metal-insulator-metal capacitor in part (b) of FIG. 11 may extend into a lower level of a die so as to connect to a lower level metal layer in the die.

Parts (d)-(f) of FIG. 11 are top views of the gull-wing type metal-insulator-metal capacitors of parts (a)-(c) of FIG. 11, in accordance with some embodiments of the present disclosure.

Part (d) of FIG. 11 is a top view of the gull-wing type metal-insulator-metal capacitor of Part (a) of FIG. 11. The top metal layer 1103 is in a rectangular shape from the top view. The thick black lines in part (d) of FIG. 11 show the corresponding locations of the wing roots 1105.

Part (e) of FIG. 11 is a top view of the gull-wing type metal-insulator-metal capacitor of part (b) of FIG. 11. The top metal layer 1103 is in a rectangular shape from the top view. The thick black line in part (e) of FIG. 11 shows the corresponding location of the wing root 1105.

Part (f) of FIG. 11 is a top view of the gull-wing type metal-insulator-metal capacitor of part (c) of FIG. 11. The top metal layer 1103 is in a rectangular shape from the top view. The thick black line in part (f) of FIG. 11 shows the corresponding location of the wing roots 1105.

Although not being shown in parts (a)-(f) of FIG. 11, each of the top metal layer 1103 and the bottom metal layer 1101 can be electrically connected to any other elements with various types of electrical connections.

In accordance with some embodiments of the disclosure, a stacked CIS structure is provided. The stacked CIS structure comprises: a first die comprising: a photodiode comprising an anode electrically connected to a first reference voltage and a cathode; a transfer gate comprising a first terminal electrically connected to the cathode of the photodiode and a second terminal electrically connected to a first floating node; a SCG switch electrically connected between the first floating node and a second floating node; a reset switch electrically connected between the second floating node and a second reference voltage; a floating node diffusion capacitor electrically connected between the first reference voltage and the first floating node; and a SCG diffusion capacitor electrically connected between the first reference voltage and the second floating node; a second die comprising: a source follower transistor comprising a gate terminal electrically connected to the first floating node, a drain terminal connected to the second reference voltage and a source terminal; and a row select switch connected between the source terminal of the source follower transistor and a third floating node; and a third die comprising an image sensing circuit electrically connected to the third floating node.

In accordance with some embodiments of the disclosure, a stacked CIS structure is provided. The stacked CIS structure comprises: a first die comprising: a photodiode comprising an anode electrically connected to a first reference voltage and a cathode; a transfer gate comprising a first terminal electrically connected to the cathode of the photodiode and a second terminal electrically connected to a first floating node; a first reset switch electrically connected between the first floating node and a second reference voltage; and a floating node diffusion capacitor electrically connected between the first reference voltage and the first floating node; a second die comprising: a SCG switch electrically connected between the first floating node and a second floating node; a SCG diffusion capacitor electrically connected between the first reference voltage and the second floating node; a second reset switch electrically connected between the second floating node and the second reference voltage; a source follower transistor comprising a gate terminal electrically connected to the first floating node, a drain terminal connected to the second reference voltage and a source terminal; and a row select switch connected between the source terminal of the source follower transistor and a third floating node; and a third die comprising an image sensing circuit electrically connected to the third floating node.

In accordance with some embodiments of the disclosure, a stacked CIS structure is provided. The stacked CIS structure comprises: a first die comprising: a photodiode comprising an anode electrically connected to a first reference voltage and a cathode; a transfer gate comprising a first terminal electrically connected to the cathode of the photodiode and a second terminal electrically connected to a first floating node; a floating node diffusion capacitor electrically connected between the first reference voltage and the first floating node; a SCG switch electrically connected between the first floating node and a second floating node; a SCG diffusion capacitor electrically connected between the first reference voltage and the second floating node; a LOF switch electrically connected between the second floating node and a third floating node; first reset switch electrically connected between the third floating node and a second reference voltage; second reset switch electrically connected between a fourth floating node and the second reference voltage; and metal-insulator-metal capacitor electrically connected between the third floating node and the fourth floating node; a second die comprising: source follower transistor comprising a gate terminal electrically connected to the first floating node, a drain terminal connected to the second reference voltage and a source terminal; and a row select switch connected between the source terminal of the source follower transistor and a fifth floating node; and a third die comprising an image sensing circuit electrically connected to the fifth floating node.

In accordance with some embodiments of the disclosure, a stacked CIS structure is provided. The stacked CIS structure comprises: a first die comprising: a photodiode comprising an anode electrically connected to a first reference voltage and a cathode; a transfer gate comprising a first terminal electrically connected to the cathode of the photodiode and a second terminal electrically connected to a first floating node; a floating node diffusion capacitor electrically connected between the first reference voltage and the first floating node; a LOF switch electrically connected between the first floating node and a second floating node; a first reset switch electrically connected between the second floating node and a second reference voltage; a second reset switch electrically connected between a third floating node and the second reference voltage; and a metal-insulator-metal capacitor electrically connected between the second floating node and the third floating node; a second die comprising: a SCG switch electrically connected between the first floating node and a fourth floating node; a SCG diffusion capacitor electrically connected between the first reference voltage and the fourth floating node; a third reset switch electrically connected between the fourth floating node and the second reference voltage; a source follower transistor comprising a gate terminal electrically connected to the first floating node, a drain terminal connected to the second reference voltage and a source terminal; and a row select switch connected between the source terminal of the source follower transistor and a fifth floating node; and a third die comprising an image sensing circuit electrically connected to the fifth floating node.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A stacked CMOS image sensor (CIS) structure, comprising:
    a first die comprising:
        a photodiode comprising an anode electrically connected to a first reference voltage and a cathode;
        a transfer gate comprising a first terminal electrically connected to the cathode of the photodiode and a second terminal electrically connected to a first floating node;
        a selective conversion gain (SCG) switch electrically connected between the first floating node and a second floating node;
        a reset switch electrically connected between the second floating node and a second reference voltage;
        a floating node diffusion capacitor electrically connected between the first reference voltage and the first floating node; and
        a SCG diffusion capacitor electrically connected between the first reference voltage and the second floating node;
    a second die comprising:
        a source follower transistor comprising a gate terminal electrically connected to the first floating node, a drain terminal connected to the second reference voltage and a source terminal,
        wherein the second die further comprises a gull-wing type metal-insulator-metal (MIM) capacitor with a prominent bend in the wing inner section towards the wing root; and
        a row select switch connected between the source terminal of the source follower transistor and a third floating node; and
    a third die comprising an image sensing circuit electrically connected to the third floating node.

2. The stacked CIS structure of claim 1, wherein:
    when the SCG switch is in an off state, only the floating node diffusion capacitor is configured to be charged by a current from the photodiode; and
    when the SCG switch is in an on state, both the floating node diffusion capacitor and the SCG diffusion capacitor are configured to be charged by the current from the photodiode.

3. The stacked CIS structure of claim 2, wherein the photodiode is configured to detect low light illuminance when the SCG switch is in the off state.

4. The stacked CIS structure of claim 2, wherein the photodiode is configured to detect high light illuminance when the SCG switch is in the on state.

5. The stacked CIS structure of claim 1, wherein the floating node diffusion capacitor comprises a P-N junction formed between a p-type implant and an n-type implant.

6. The stacked CIS structure of claim 1, further comprising:
    a second photodiode comprising an anode electrically connected to the first reference voltage and a cathode;
    a second transfer gate comprising a first terminal electrically connected to the cathode of the second photodiode and a second terminal electrically connected to the first floating node.

7. The stacked CIS structure of claim 1, wherein the gate terminal of the source follower transistor is electrically connected to the first floating node through wafer-to-wafer bonding.

8. The stacked CIS structure of claim 1, wherein the image sensing circuit is electrically connected to the third floating node through wafer-to-wafer bonding.

9. The stacked CIS structure of claim 1, wherein the gull-wing type metal-insulator-metal (MIM) capacitor is formed with a top metal layer, an insulator layer and a bottom metal layer, and wherein the top metal layer and the bottom metal layer are any two metal layers in the second die.

10. A method for manufacturing a stacked CMOS image sensor (CIS) structure, the method comprising:
    forming a first die comprising:
        a photodiode comprising an anode electrically connected to a first reference voltage and a cathode;
        a transfer gate comprising a first terminal electrically connected to the cathode of the photodiode and a second terminal electrically connected to a first floating node;
        a selective conversion gain (SCG) switch electrically connected between the first floating node and a second floating node;
        a reset switch electrically connected between the second floating node and a second reference voltage;
        a floating node diffusion capacitor electrically connected between the first reference voltage and the first floating node; and
        a SCG diffusion capacitor electrically connected between the first reference voltage and the second floating node;
    forming a second die comprising:
        a source follower transistor comprising a gate terminal electrically connected to the first floating node, a drain terminal connected to the second reference voltage and a source terminal; and
        a row select switch connected between the source terminal of the source follower transistor and a third floating node, wherein the second die further comprises a gull-wing type metal-insulator-metal (MIM) capacitor with a prominent bend in the wing inner section towards the wing root; and;
forming a third die comprising an image sensing circuit electrically connected to the third floating node;
stacking the first die, the second die and the third die in to the stacked CIS structure.

11. The method of claim 10, wherein:
when the SCG switch is in an off state, only the floating node diffusion capacitor is configured to be charged by a current from the photodiode; and
when the SCG switch is in an on state, both the floating node diffusion capacitor and the SCG diffusion capacitor are configured to be charged by the current from the photodiode.

12. The method of claim 11, wherein the photodiode is configured to detect low light illuminance when the SCG switch is in the off state.

13. The method of claim 11, wherein the photodiode is configured to detect high light illuminance when the SCG switch is in the on state.

14. The method of claim 10, wherein the floating node diffusion capacitor comprises a P-N junction formed between a p-type implant and an n-type implant.

15. The method of claim 10, wherein the first die further comprising:
a second photodiode comprising an anode electrically connected to the first reference voltage and a cathode;
a second transfer gate comprising a first terminal electrically connected to the cathode of the second photodiode and a second terminal electrically connected to the first floating node.

16. The method of claim 10, wherein the gate terminal of the source follower transistor is electrically connected to the first floating node through wafer-to-wafer bonding.

17. The method of claim 10, wherein the image sensing circuit is electrically connected to the third floating node through wafer-to-wafer bonding.

18. The method of claim 10, wherein the gull-wing type metal-insulator-metal (MIM) capacitor is formed with a top metal layer, an insulator layer and a bottom metal layer, and wherein the top metal layer and the bottom metal layer are any two metal layers in the second die.

19. A stacked CMOS image sensor (CIS) structure, comprising:
a first die comprising:
a plurality of photodiodes, each of the plurality of photodiodes comprising an anode electrically connected to a first reference voltage and a cathode;
a plurality of transfer gates, each of the plurality of transfer gates comprising a first terminal electrically connected to the cathode of a corresponding photodiode of the plurality of photodiodes and a second terminal electrically connected to a first floating node;
a selective conversion gain (SCG) switch electrically connected between the first floating node and a second floating node;
a reset switch electrically connected between the second floating node and a second reference voltage;
a floating node diffusion capacitor electrically connected between the first reference voltage and the first floating node; and
a SCG diffusion capacitor electrically connected between the first reference voltage and the second floating node;
a second die comprising:
a source follower transistor comprising a gate terminal electrically connected to the first floating node, a drain terminal connected to the second reference voltage and a source terminal; and
a row select switch connected between the source terminal of the source follower transistor and a third floating node,
wherein the second die further comprises a gull-wing type metal-insulator-metal (MIM) capacitor with a prominent bend in the wing inner section towards the wing root; and
a third die comprising an image sensing circuit electrically connected to the third floating node.

20. The stacked CIS structure of claim 19, wherein:
when the SCG switch is in an off state, only the floating node diffusion capacitor is configured to be charged by a current from the plurality of photodiodes; and
when the SCG switch is in an on state, both the floating node diffusion capacitor and the SCG diffusion capacitor are configured to be charged by the current from the plurality of photodiodes.

* * * * *